United States Patent [19]

Hasegawa

[11] Patent Number: 4,957,341
[45] Date of Patent: Sep. 18, 1990

[54] INTEGRAL TYPE LENS
[75] Inventor: Shinichi Hasegawa, Tokyo, Japan
[73] Assignee: Pioneer Electronic Corporation, Tokyo, Japan
[21] Appl. No.: 363,580
[22] Filed: Jun. 7, 1989
[30] Foreign Application Priority Data Oct. 6, 1988 [JP] Japan .......................... 63-130398[U]

[51] Int. Cl.⁵ .............................................. G02B 7/02
[52] U.S. Cl. ................................... 350/254; 350/245; 350/252
[58] Field of Search ............... 350/252, 247, 245, 255, 350/257, 451, 254

[56] References Cited
U.S. PATENT DOCUMENTS 4,662,717  5/1987  Yamada et al. ...................... 350/252

Primary Examiner—Bruce Y. Arnold
Assistant Examiner—James Phan
Attorney, Agent, or Firm—Sughrue, Mion, Zinn, Macpeak & Seas

[57] ABSTRACT

An integral type lens for use with a projection TV is composed of a first lens having a rim in the outer circumference thereof and a second lens disposed within the rim of this first lens. The integral type lens comprises a plurality of slanting faces inclined with respect to a tangential line at an equal distance from a lens center on either one of an inside face of the rim of the first lens and an outside face of the second lens, and contact pieces contacting the plurality of slanting faces on the other of the inside face of the rim of the first lens and the outside face of the second lens. The slanting faces and the contact pieces are engaged with each other to conform the optical axes of the first and second lenses to each other.

6 Claims, 4 Drawing Sheets

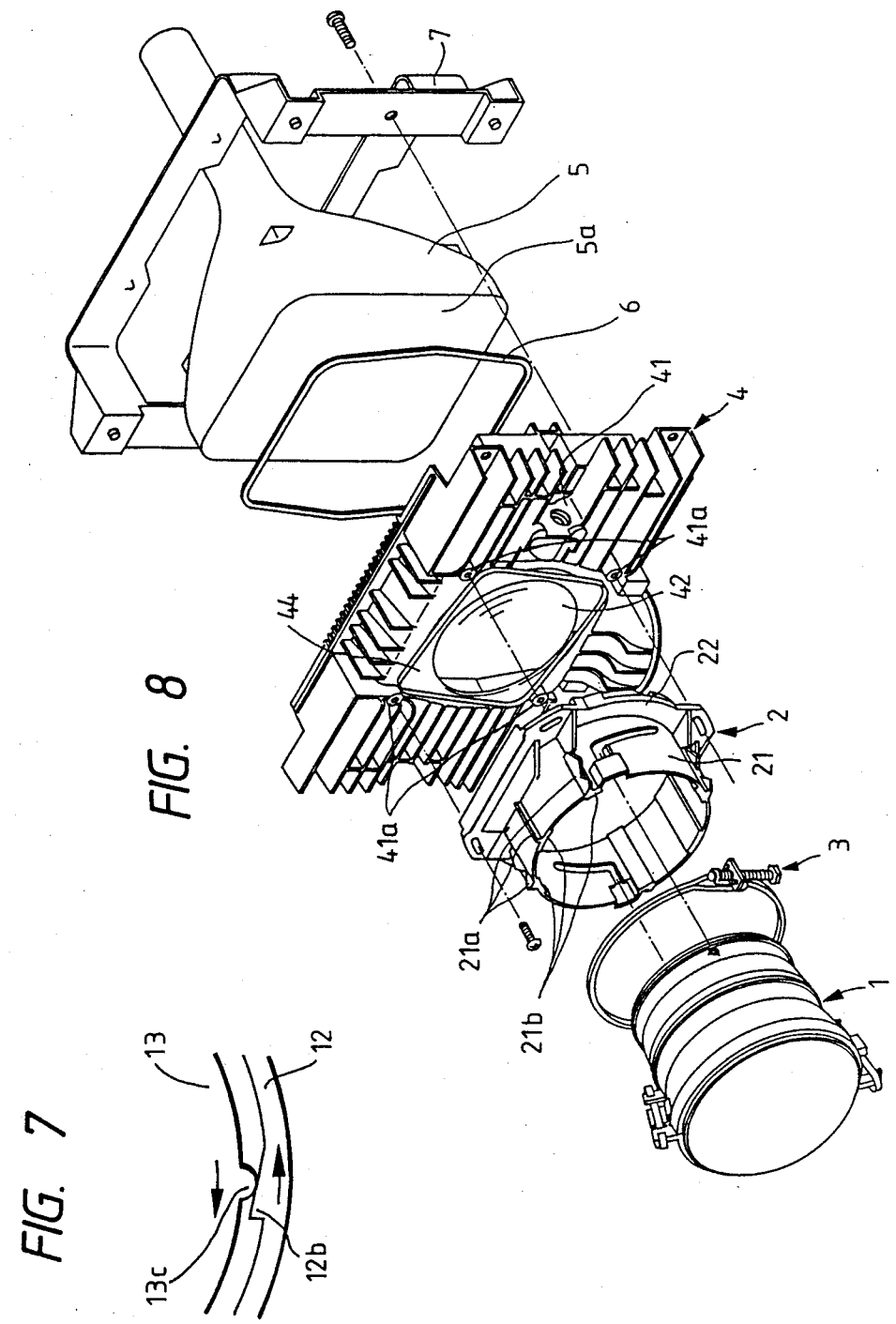

INTEGRAL TYPE LENS

BACKGROUND OF THE INVENTION

The present invention relates to an integral type lens in which two lenses, such as plastic lenses, are fitted to each other and are integrally combined with each other.

FIGS. 1 to 3 show a conventional integral type lens of this kind, FIG. 1 is an exploded perspective view of the lens. FIG. 2 is a cross-sectional view of the lens in the diametrical direction thereof. FIGS. 3A and 3B are views of two lenses seen from the inside thereof.

The integral type lens is used for a projecting lens of a projection television. In FIGS. 1 to 3, a first group of lenses 10 are disposed on the screen side of the projection television. Reference numeral 20 is a second group of lenses. The first group of lenses 10 and the second group of lenses 20 are constructed as spherical lenses as shown in FIG. 2 and are made of plastic for ease of processing.

Rim 10a is formed in the outer circumference of first lens group 10. Flange 20b is formed on side face 20a of second lens group 20. As shown in FIG. 2, when the first and second lens groups are integrally formed, these lens groups are fitted to each other such that side face 20a of second lens group 20 contacts an inside face of rim 10a of first lens group 10 and an upper face of flange 20b of second lens group 20 contacts a lower face of rim 10a.

When the above-mentioned plastic lenses are molded, a high degree of accuracy can be obtained in the face of the lens, but it is difficult to improve the accuracy of the lens diameter. Further, the size of a plastic lens molded by acrylate resin or the like is altered by changes in humidity temperature etc. Therefore, the inner diameter of rim 10a of the first lens group 10 is manufactured to be slightly greater than the outer diameter of side face 20a of the second lens group 20. When the first and second lens groups are fitted to each other, play therebetween is eliminated by disposing a member such as a tape, etc., in a clearance between contact faces of the first and second lens groups, and the thickness of the tape, etc., is adjusted to assemble the lens groups such that the optical axes of the respective lenses are in conformity with each other.

Therefore, in accordance with the conventional integral type lens mentioned above, it is difficult to accurately conform the optical axes of the two lens groups to each other and it takes a considerable amount of time to assemble the lens groups.

SUMMARY OF THE INVENTION

To solve the problems mentioned above, an object of the present invention is to provide an integral type lens which can be assembled easily, with the optical axes of the two lens groups forming the integral type lens being in conformity.

To attain the above object, the present invention resides in an integral type lens composed of a first lens having a rim in the outer circumference thereof and a second lens disposed within the rim of the first lens, said integral type lens comprising a plurality of slanting faces inclined with respect to a tangential line at an equal distance from a lens center on either one of an inside face of the rim of said first lens and an outside face of said second lens; and contact pieces contacting said plurality of slanting faces on the other of the inside face of the rim of said first lens and the outside face of said second lens; the slanting faces and the contact pieces being engaged with each other to conform the optical axes of the first and second lenses to each other.

BRIEF DESCRIPTION OF THE DRAWINGS

The present invention will be more apparent from the following description of the preferred embodiments thereof in conjunction with the accompanying drawings in which:

FIG. 7 is a view for explaining the engagement between a projection guide and a contact piece in the embodiment of the present invention;

FIG. 8 is an exploded perspective view of a projector using the integral type lens in the embodiment of the present invention.

DESCRIPTION OF THE PREFERRED EMBODIMENTS

Figure 1:
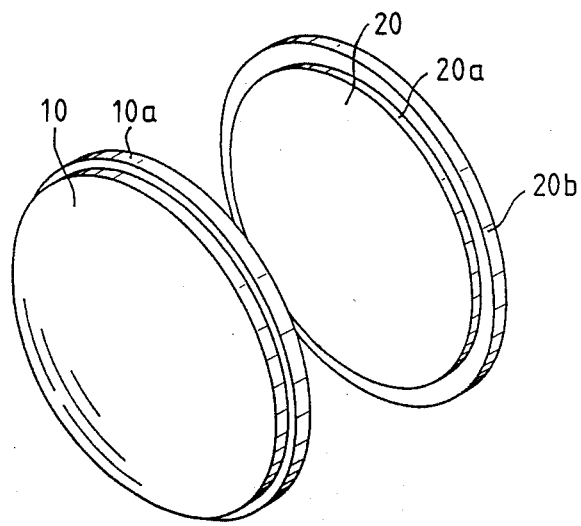
FIG. 1 is an exploded perspective view of a conventional integral type lens.
Figure 2:
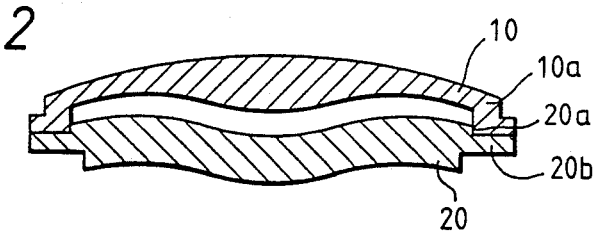
FIG. 2 is a cross-sectional view of an assembly of the conventional integral type lens of FIG. 1.
Figure 3A:
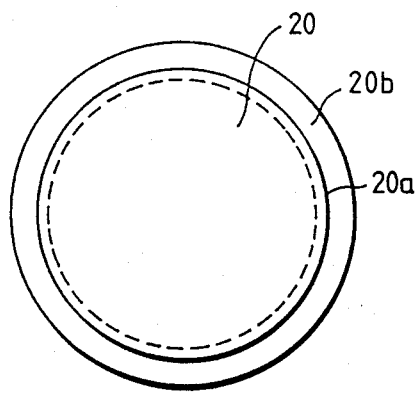
FIGS. 3A and 3B are views showing two lenses in the conventional example.
Figure 3B:
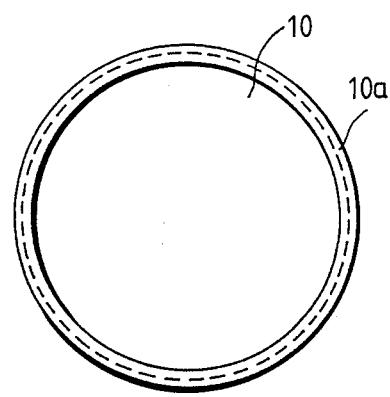

The preferred embodiments of an integral type lens of the present invention will now be described in detail with reference to the accompanying drawings.

FIG. 8 is an exploded perspective view of a projector using the integral type lens in an embodiment of the present invention.

In this figure, lens body tube 1 has a plurality of groups of lenses therein and corrects various kinds of aberrations and mainly functions as an image forming portion. Body tube support portion 2 has a cylindrical portion 21 for receiving lens body tube 1 and also has a flange 22. Lens body tube 1 is inserted into cylindrical portion 21 and is fastened by wire band 3 such that a rib 21a in the outer circumference of cylindrical portion 21 is directed to a center thereof. Lens body tube 1 is fixed to body tube support portion 2 by the press-contact of projecting portion 21b formed on the inner face of rib 21a.

Coupler 4 cools tube face 5a of projecting tube 5 and optically couples an optical system on the side of lens body tube 1 to a projecting tube 5. A meniscus lens 42 for mainly correcting a curve of an image is fixed by a lens fixing frame 44 via a packing to a coupler frame 41 molded by aluminum die-casting. Projecting tube 5 and coupler frame 41 are fixed to each other by attaching frame 7 such that packing 6 is located between projecting tube 5 and coupler frame 41. A liquid for functioning as optical coupling and cooling portions is sealed between meniscus lens 42 and projecting tube 5.

Four cylindrical fixing washers 41a are formed in a peripheral portion of meniscus lens 42 of coupler frame 41. Body tube support portion 2 is fixed by fastening flange 22 to the above fixing washers 41a by screws.

Figure 9:
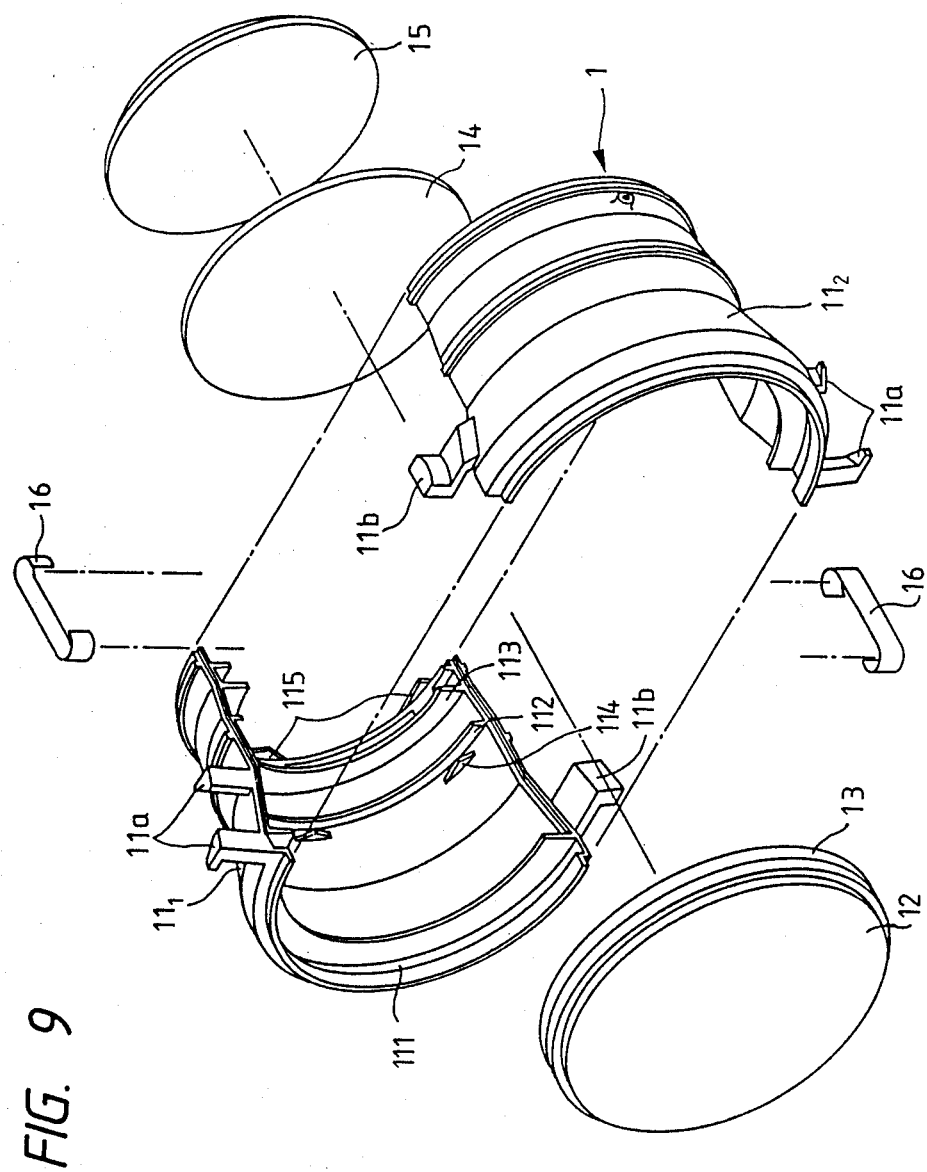
FIG. 9 is an exploded perspective view of a lens body tube in FIG. 8.

FIG. 9 is an exploded perspective view of lens body tube 1. With respect to lens body tube 1, a first group of lenses 12, a second group of lenses 13, a third group of lenses 14 and a fourth group of lenses 15 are fitted into tube frames $11_1$ and $11_2$ divided into halves and molded by the same die to assemble them together. The two halves are integrally fixed to each other by a biasing force of elastic plates 16 made of a metal in claw portions $11_a$ and $11_b$ formed on both sides of tube frames $11_1$ and $11_2$.

The first group of lenses 12 are disposed on the screen side of projection television and are integrally fitted to the second group of lenses 13, and the integral lens if further fitted to groove portion 111 formed in an inner wall of tube frame $11_1$,$11_2$ at a front edge thereof. Third and fourth groups of lenses 14 and 15 are fitted between stopper plates 112, 113 and claws 114, 115 formed in predetermined positions of the inner wall of tube frame $11_1$, $11_2$.

In the above-mentioned embodiment, since the tube frame $11_1$, $11_2$ is divided into two sections, it is very easy to assemble the lens body tube.

Figure 4:
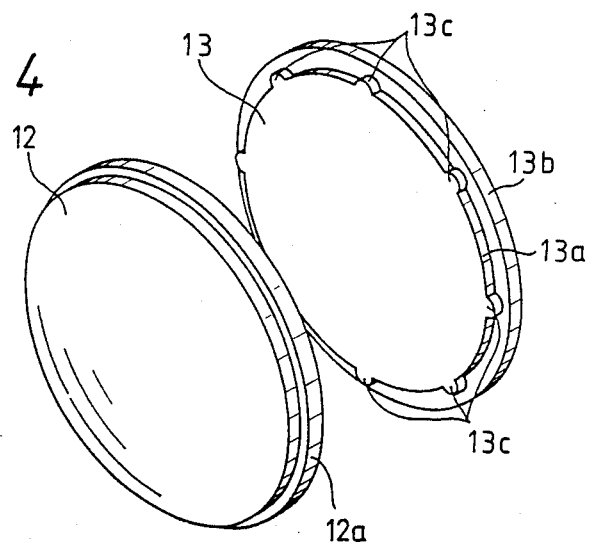
FIG. 4 is an exploded perspective view showing an integral type lens in an embodiment of the present invention.
Figure 5:
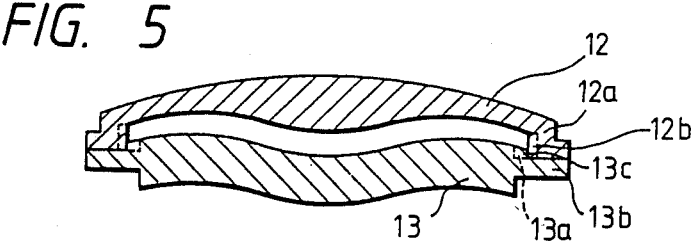
FIG. 5 is a cross-sectional view of an assembly of the integral type lens of FIG. 4.
Figure 6A:
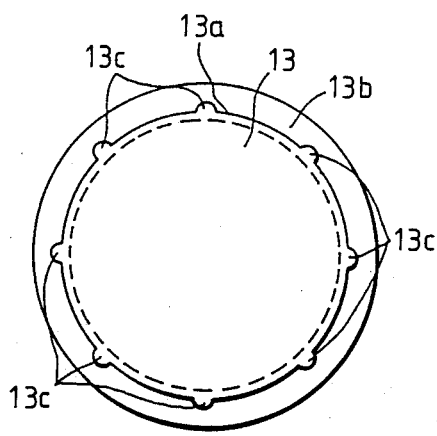
FIGS. 6A and 6B are views showing first and second groups of lenses in the embodiment of the present invention.
Figure 6B:
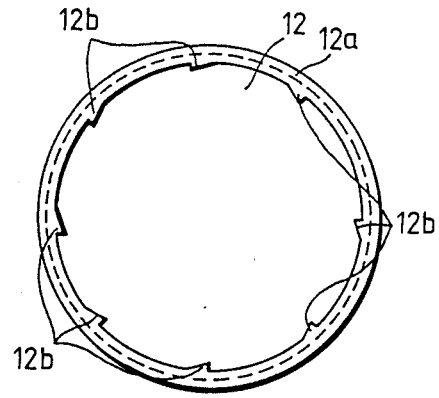

FIGS. 4 to 6 are views showing the first group of lenses 12 and the second group of lenses 13. FIG. 4 is an exploded perspective view of these lens groups, and FIG. 5 is a cross-sectional view thereof in the diametrical direction, and FIGS. 6A and 6B are views of two lenses seen from the inside thereof. Each lens group will hereafter be referred to as a lens.

Rim 12a is formed in the outer circumference of first lens 12. Flange 13b is formed in side face 13a of second lens 13. Further, a plurality of guide projections 12b, which serve as guides, are formed on the inside face of rim 12a of lens 12 and are spaced from each other at an equal distance and has slanting faces slightly inclined with respect to a tangential line of the outer circumference lens 12. Projecting contact pieces 13c are spaced from each other at an equal distance on side face 13a of lens 13, and the number of contact pieces 13c is equal to the number of guide projections 12b.

The radius from the optical axis of second lens 13 (the central position of the lens) to a tip end of contact pieces 13c is set to be approximately an intermediate value between the radius from the optical axis of the first lens 12 to a tip end of the slanting faces of guide projections 12b and the radius of rim 12a on the inside face thereof.

When first lens 12 and second lens 13 are integrally assembled, side faces 13a and contact pieces 13c of lens 13 are disposed within rim 12a of first lens 12, lens 12 and lens 13 are rotated relative to one another in the direction of the arrows shown in FIG. 7. At this time, contact pieces 13c are moved on the slanting faces of guide projections 12b and are pressed thereby so that a resistance is caused between contact pieces 13c and guide projections 12b. Further, first lens 12 and second lens 13 are fixed to each other by the frictional force between contact pieces 13c and guide projections 12b or a slightly elastic deformation of contact pieces 13c.

Guide projections 12b and contact pieces 13c are equally spaced from each other from the respective optical axes of first lens 12 and second lens 13. Therefore, when guide projections 12b and contact pieces 13c are engaged and fixed to each other as mentioned above, the optical axes of first lens 12 and second lens 13 can be accurately conformed to each other.

In the above-mentioned embodiment, the guide projections 12b are formed in the first lens having the rim and the contact pieces 13c are formed in the second lens disposed in the first lens. However, the guide projections may be formed in the second lens and the contact pieces may be formed in the first lens.

As mentioned above, in accordance with the present invention, an integral type lens comprises a plurality of slanting faces inclined with respect to a tangential line at an equal distance from a lens center on either one of an inside face of a rim of the first lens and an outside face of the second lens, and contact pieces contacting the plurality of slanting faces on the other of the inside face of the rim of the first lens and the outside face of the second lens. The slanting faces and the contact pieces are engaged with each other to fit the first and second lenses to each other. Accordingly, the optical axes of the first and second lenses can be accurately conformed to each other and the first and second lenses can be simply assembled, thereby providing an integral type lens.

What is claimed is:

1. An integral type lens composed of a first lens having a rim in the outer circumference thereof and a second lens disposed within the rim of this first lens and having an outside face which faces an inside face of said rim, said integral type lens comprising:
    a plurality of guide projections positioned on one of said inside face and said outside face, each said guide projections having a slanting surface inclined with respect to a plane tangent to the said face on which said guide projections are positioned; and
    a plurality of contact pieces positioned on the other of said inner face and said outside face;
    said contact pieces engaging respective ones of said guide projection slanting surfaces to conform the optical axes of said first and second lenses.

2. An integral type lens as claimed in claim 1, wherein said guide projections are positioned on the inner face of said rim of said first lens, and said contact pieces are positioned on the outside face of said second lens.

3. An integral type lens as claimed in claim 2, wherein the radial distance between the optical axis of said second lens and the tips of said contact pieces is intermediate (a) the radial distance from the optical axis of said first lens and the inner face of said rim, and (b) the radial distance from the optical axis of said first lens and the tip of said guide projections.

4. An integral type lens as claimed in claim 1, wherein said guide projections are positioned on the outer face of said second lens, and said contact pieces are positioned on the inner face of said rim of said first lens.

5. An integral type lens as claimed in claim 4 wherein the radial distance between the optical axis of said first lens and the tip of said contact pieces is intermediate (a) the radial distance between the optical axis of said second lens and said outer face of said second lens and (b) the radial distance between the optical axis of said second lens and the tip of said guide projections.

6. An integral lens as claimed in any of claims 1–5, wherein said guide projections and said contact pieces are equally spaced around said faces of said first and second lenses.

* * * * *